United States Patent [19]

Takizawa

[11] 4,337,302
[45] Jun. 29, 1982

[54] SEALING MEANS FOR TERMINAL SECTION OF SEALED TYPE STORAGE BATTERY

[75] Inventor: Yoshihiro Takizawa, Tokyo, Japan

[73] Assignee: Furukawa Denchi Kabushiki Kaisha, Yokohama, Japan

[21] Appl. No.: 251,752

[22] Filed: Apr. 7, 1981

[30] Foreign Application Priority Data

Apr. 12, 1980 [JP] Japan .................................. 55-47484

[51] Int. Cl.³ ............................................ H01M 2/30
[52] U.S. Cl. .................................. 429/181; 429/185; 174/152 GM; 174/50.61
[58] Field of Search ............... 429/171, 174, 181, 185; 174/50.5, 50.61, 152 GM

[56] References Cited

U.S. PATENT DOCUMENTS 3,416,964  12/1968  Michalko ............................ 429/174
3,421,945  1/1969   Michalko ............................ 429/174
3,957,538  5/1976   Fairweather et al. ............. 429/171

FOREIGN PATENT DOCUMENTS 1506959  4/1978  United Kingdom ....... 174/152 GM

Primary Examiner—Donald L. Walton
Attorney, Agent, or Firm—Armstrong, Nikaido, Marmelstein & Kubovcik

[57] ABSTRACT

A terminal member of a storage battery and an annular member surrounding the terminal member are bonded together hermetically through an annular bonding material member which comprises at least two annular bonding material members spaced apart from each other by at least one annular space which is formed in the middle of the depth of the through opening of the annular member in which the terminal member is inserted.

2 Claims, 4 Drawing Figures

SEALING MEANS FOR TERMINAL SECTION OF SEALED TYPE STORAGE BATTERY

BACKGROUND OF THE INVENTION

This invention relates to a sealing means for sealing a terminal section extending between a terminal member of a sealed type storage battery and an inner peripheral surface of an annular member disposed to surround the terminal member.

A known means for sealing a terminal section of a sealed alkaline storage battery such as used under vacuum atmosphere, for instance, for an artificial satellite or the like, comprises a terminal member and an annular ceramic member disposed to surround the terminal member, hermetically sealed together, as shown in FIG. 1. Namely, because the terminal member a is required to be hermetically sealed to a metallic battery cover b in electrically insulating relation therewith, there is interposed therebetween hermetically an annular ceramic member c sealed as described below. Namely, the terminal member a and the inner peripheral surface of the annular ceramic member c are bonded together hermetically through a single continuous band-shaped annular bonding material layer of a desired thickness. Namely, the layer comprises an annular metallized bonding material layer d formed by metallizing the ceramic member c, an annular plating layer e formed on the inner peripheral surface of the layer d, e.g., by a nickel plating procedure, and an annular soldering layer f bonding between the plating layer e and the peripheral surface of the terminal member a by a soldering procedure.

Almost the same hermetically sealing as above is applied between an outer peripheral surface of the annular ceramic member c and an opening member b' of the cover b surrounding the same, but any further explanation thereof is omitted for convenience.

The resultant ceramic type sealed storage battery terminal section provided with such a sealing means is defective in that, in the course of use of the battery, the metal of the nickel plating layer e and that of the metallized layer d are corroded, and the metallized layer d allows the electrolyte to pass therethrough owing to its ceramic porosity, and accordingly it often happens that the electrolyte gradually creeps upwards and leaks out to the outside surface of the battery and consequently the battery is lowered in function and is shortened in its service life. Thus, as long as the terminal section is sealed by a continuous layer as shown in FIG. 1, there occurs the unfavorable phenomenon that the electrolyte is liable to leak outside along the layer.

SUMMARY OF THE INVENTION

This invention has for its object to provide a sealing means for a terminal section of a sealed type storage battery of the type wherein a terminal member of a storage battery and an annular member surrounding the terminal member are bonded together hermetically through an annular bonding material member characterized in that the annular bonding material member comprises at least two annular bonding material members spaced apart from each other by at least one annular space which is formed in the middle of the depth of the through opening of the annular member in which the terminal member is inserted.

BRIEF DESCRIPION OF THE DRAWING

FIG. 1 is a sectional view showing a conventional terminal section sealing means attached to a battery cover for a storage battery, FIG. 2 is a similar sectional view showing one example of a terminal section sealing means of this invention, FIG. 3 is a perspective view, partly in cross-section of a main portion of the sealing means as above, and FIG. 4 is a sectional view showing another example of this invention.

DETAILED DESCRIPTION

Figure 1:
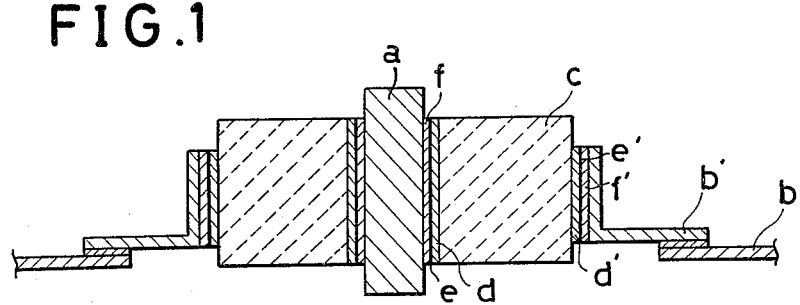
Figure 2:
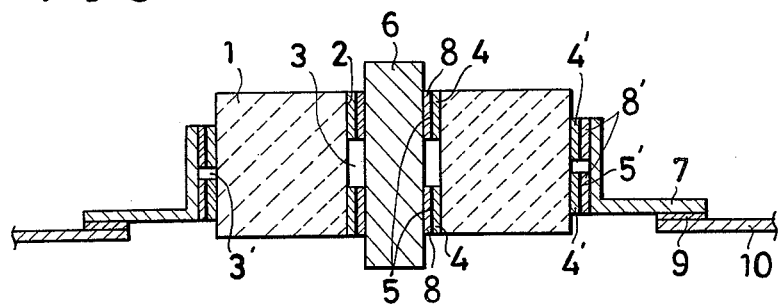
Figure 3:
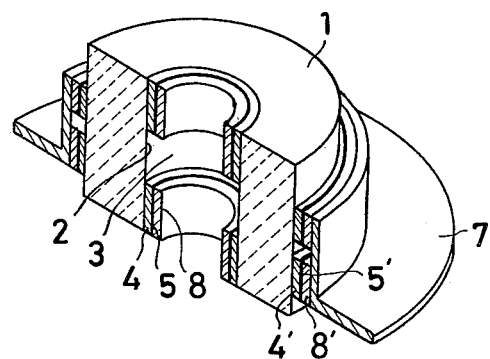

Embodying examples of this invention will be explained with reference to the accompanying drawings:

FIG. 2 shows an embodying example wherein the sealing means of this invention is applied to a ceramic type sealing type cover for a sealed type alkaline storage battery having a terminal member 6. A circular annular ceramic member 1 having at its center a circular through opening 2 is previously worked as described below. Namely, each of the inner peripheral surface and the outer peripheral surface of the annular ceramic member 1 is coated, by any known metallizing procedure, with two upper and lower metallized bonding material layers 4, 4 and 4', 4' respectively, spaced apart from each other by single annular spaces 3, 3', respectively, which are formed thereon in the middle of the depth or height of the through opening 2, of the member 1, and nickel plating layers 5, 5' are then formed by any known plating procedure, on the outer surfaces of these layers 4, 4, 4', 4', respectively, for coating them.

In the illustrated example, the annular ceramic member 1 is 6 mm in height, for instance, and the inner peripheral surface thereof is coated with upper and lower metallized bonding material annular layers 4, 4, each of which is 2 mm wide, and with an annular space 3 of 2 mm in width formed between the layers 4, 4, in the middle of the height of the ceramic member 1, and the outer peripheral surface thereof is coated with upper and lower metallized bonding material annular layers 4', 4', each of which is 1 mm wide, and with an annular space 3' of 1 mm in width formed, between the layers 4', 4', in the middle of the height of the ceramic member 1 and the whole surface of each of these layers 4, 4, 4', 4' is coated with a nickel plating layer 5, 5, 5', 5', respectively.

The annular ceramic member 1 is press-molded and sintered and composed chiefly of alumina. The metallizing procedure is carried out, for instance, by applying to member 1 a coating liquid chiefly composed of molybdenum and manganese so as to form plural annular coating layers spaced apart, as mentioned above and the same is then sintered at a high temperature so as to diffuse the Mo-Mn, react the manganese with the ceramic and deposit the molybdenum metal on the surface thereof. Thereafter, a nickel plating layer 5, 5, 5', 5' several microns in thickness is formed on each metallized layer 4, 4, 4', 4'.

A terminal member 6 in a post form is inserted through the through opening 2 of the resultant sealing component member, that is, the ceramic member 1 treated as above, and an annular metal member 7 is positioned so that the member 1 is surrounded by the annular metal member 7 and under this condition an annular gap 3 is formed between the terminal member 6 and the metallized inner peripheral surface of the annular ceramic member 1 and an annular gap 3' is formed between the outer peripheral surface thereof and the surrounding annular metal member 7. The nickel plated layers 5, 5' are applied with respective solders and thereby the respective mutually facing surfaces are hermetically bonded together by soldering.

Numerals 8, 8' denote the soldering layers thus formed. The resultant sealing means or assembly of the terminal section thus assembled is then fixed by soldering 9 to the peripheral edge of the opening portion of a battery cover 10 through its annular metal member 7, so that a completed ceramic sealing cover for a battery is obtained.

A sealed alkaline battery using this ceramic type sealing cover has the function that, even when, during its service use, the alkaline electrode contained therein is adhered to the bottom of the terminal section so that the nickel plating layer 5 and the metal surface of the lower metallized bonding material layer 4 are dissolved and consequently the electrolyte penetrates into the porous surface thereof and creeps upwards along the lower bonding material layer 4, the upward creeping thereof is cut off by the space 3 and the leakage thereof to the exterior can be prevented for a long time, due to the annular space 3 interposed between the lower and the upper metallized bonding layer 4, 4.

A storage battery having the foregoing construction of this invention and a similar conventional storage battery having a conventional continuous metallized bonding layer of 6 mm in width are subjected to a comparison test in such a manner that each is applied with a voltage of 1.3 V and is contained in a thermo-hydrostat of 50° C. and generation of leakage of alkaline electrolyte from the ceramic sealing type cover thereof is determined by phenolphthalein reaction. As a result thereof, the leakage is generated in about 2 years in the case of the conventional battery, but no generation of leakage can be recognized even after the lapse of over 3 years in the case of the battery of this invention.

Figure 4:
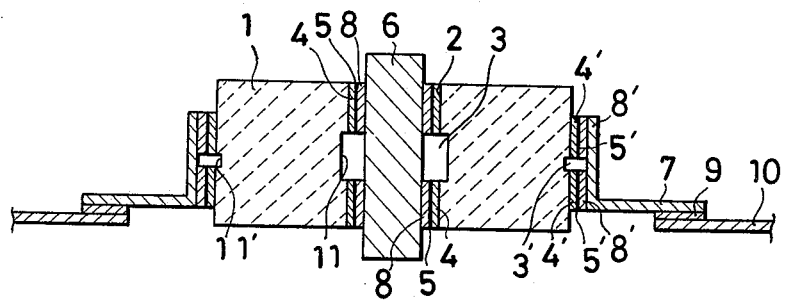

FIG. 4 shows an embodying example using a preferred sealing means for the terminal section which can substantially increase the width of the annular space between the upper and lower metallized bonding material layers and can prevent electrolyte leakage more effectively. In this example, each of the inner and outer peripheral surfaces of the annular ceramic member 1 is provided, just in the middle of the height thereof, with an annular groove 11, 11', respectively, of about 1–2 mm in width, and the remaining portions of the terminal section are constructed in almost the same manner as in the foregoing example. Namely, there is formed over the annular grooves 11, 11' annular spaces 3, 3', respectively having a width of 1–2 mm corresponding to the width of the groove 11, between the upper and lower metallized bonding material layers 4, 4, 4', 4' so that the annular spaces 3, 3' and the annular grooves, 11, 11', respectively are united with each other, and the respective nickel plating layers 5, 5, 5', 5' are formed on the spaced layers 4, 4, 4', 4'.

The annular ceramic member 1 thus constructed is connected hermetically, at its inner and outer surfaces, to the terminal member 6 and the surrounding metallic annular member 7 through respective soldering layers 8, 8' in almost the same manner as above.

With this example, since the annular grooves 11, 11' are so located as to be in alignment with the spaces 3, 3', respectively, the distance between the upper and lower metallized layers 4, 4 and 4', 4' is substantially elongated. Accordingly, supposing that the width of the spaces 3, 3' is made to be the same as that of the spaces 3, 3' formed on the flat circumferential surface in the foregoing example, the prevention of the leakage becomes more effective to that extent that the spaces are elongated by the grooves 11, 11' and this means that the spaces 3, 3' can be decreased in width, and accordingly the height of the annular ceramic member 1 can be shortened.

In the case where the grooves 11, 11' are previously formed, the upper and lower metallized coating layers 4, 4, and 4', 4', respectively, separated by spaces 3, 3' can be formed easily and reliably by using a roller coating apparatus or the like.

In the foregoing two examples, the soldering layers 8, 8' are provided only at spaced positions corresponding to the spaced metallized layers 4, 4 and 4', 4' so that annular spaces 3, 3' are further extended and thereby the prevention against the electrolyte leakage becomes more effective.

This invention is not limited to the foregoing examples, and, though not illustrated, there can be considered any desired modification that there is formed on the annular member three or more spaced layers separated from each other by two or more annular spaces formed in the middle thereof.

Thus, according to this invention, the bonding material layer for bonding between the terminal member and the surrounding annular member for inserting the same is provided with at least two annular bonding material members spaced from each other by at least one annular space formed in the middle of the depth of the through opening of the annular member, so that generation of leakage of the electrolyte from the interior of the battery can be prevented and the useful life of the battery can be extremely extended.

I claim:

1. A sealing means for sealing a metallic terminal to a metallic cover of a sealed-type storage battery, said means comprising an electrically insulating annular member surrounding said terminal, a first bonding member hermetically sealing said terminal to the inner surface of said annular member, a second bonding member hermetically sealing said cover to the outer surface of said annular member, wherein each of said first and second bonding member consists of two sections spaced from each other by at least one annular space formed in the middle of the height of said annular member.

2. The sealing means according to claim 1 wherein the inner peripheral surface of said annular member is provided with at least one annular groove in alignment with one annular space.

* * * * *